United States Patent Office 3,032,014
Patented May 1, 1962

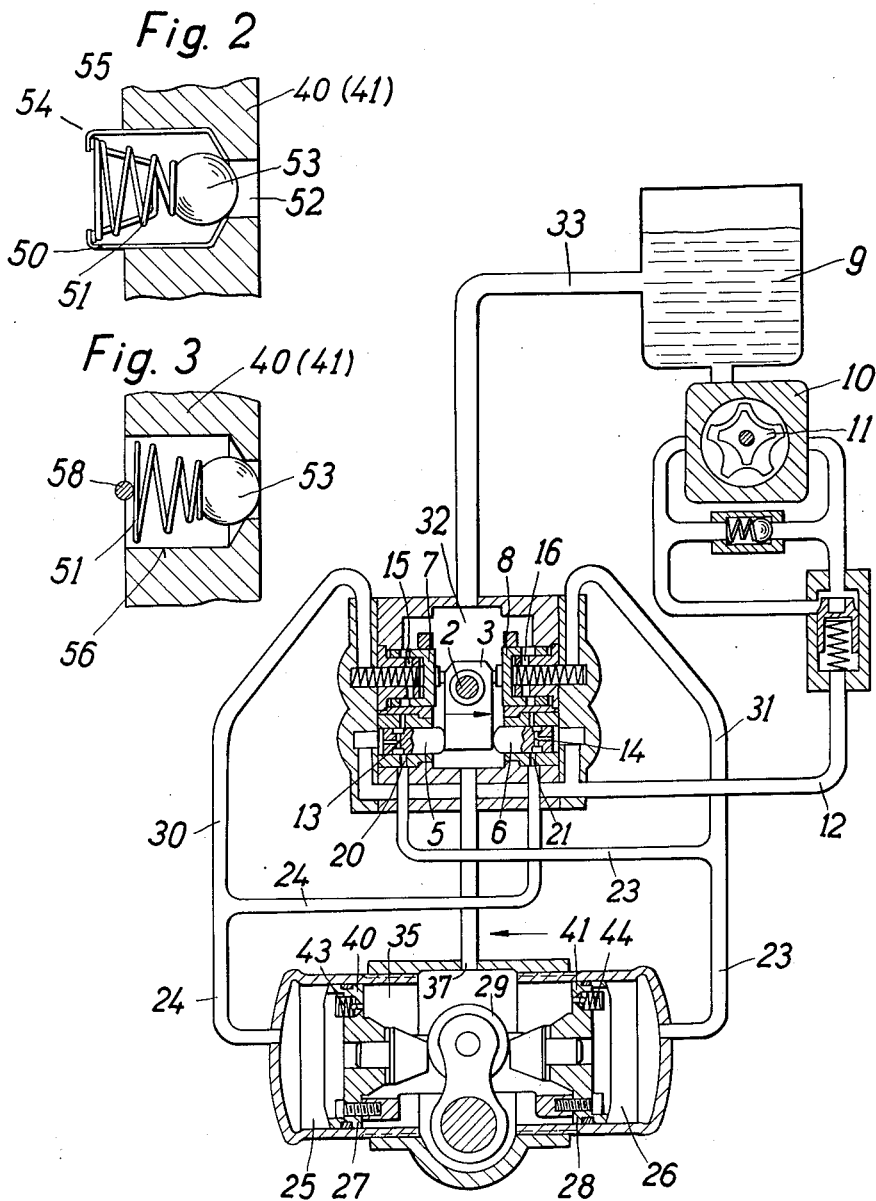

3,032,014
POWER STEERING DEVICES
Erich Jablonsky, Schwabisch Gmund, Germany, assignor to Zahnradfabrik Friedrichshafen, Aktiengesellschaft, Friedrichshafen am Bodensee, Germany
Filed July 2, 1959, Ser. No. 824,736
Claims priority, application Germany July 11, 1958
9 Claims. (Cl. 121—38)

This invention relates to power steering devices and more particularly to a cylinder arrangement therefor.

A difficulty may occur in power steering systems of the pressure fluid type due to leakage, line breakage, or pump failure. Under such conditions air may enter the oil conducting system due to a vacuum which may be formed within the pressure chambers of the oil motor. Such effects are harmful, particularly in the event of vacuum forming within the booster power cylinder, since an increase in power for effecting movement of the steering linkage is then required.

Prior art devices intended to overcome this problem have been known wherein a check valve is provided inside the main oil control valve between the ingress and egress sides for the purpose of establishing circulation from the oil reservoir should the pump fail. However, this expedient is not suitable for all types of steering systems and requires considerable modification of the control valve in order to incorporate the check valve therein. Such modification involves the addition of springs which hamper the steering operation, thereby detracting from the power boost effect. Further, the above arrangement of a check valve requires a large amount of pressure fluid to be circulated throughout the entire system and likewise through the check valves which are normally very constricted in flow passageway, and thus a strain is placed on the entire system.

Accordingly, it is an object of the present invention to provide means for overcoming the above disadvantage to the end that air will not leak into the system due to vacuum forming in either end of a double-acting booster cylinder.

It is additional object of the invention to provide means for overcoming such drawback in an extremely simple manner and one which may readily be applied to existing power boost systems.

Briefly, I accomplish the above objects by providing spring biased check valves for the pressure chambers of the boost cylinder, such valves being preferably carried directly within the piston heads at the respective cylinder ends. The valves are biased so as to open should vacuum form in a respective pressure chamber, whereby oil can find direct passage from the oil reservoir into either end of the cylinder to overcome vacuum formation.

A detailed description of my invention will now be given in conjunction with the appended drawing in which:

FIG. 1 shows the main components of a power boost cylinder and the controls therefor, primarily in cross-section; and FIGS. 2 and 3 illustrate two different types of valve mounts for use in conjunction with the invention.

Referring now to the drawing, there is represented a steering element 2 which, by conventional gear means, is capable of moving a valve actuator 3 for the purpose of actuating valves 5 and 7 at one side of the valve block housing shown, or valves 6 and 8 at the other side.

All valves 5–8 are maintained partially open by the centered position of valve actuator 3, valves 5 and 6 having stems maintained in abutment with element 3 by pressure, as will be hereinafter apparent, while valves 7 and 8 are spring biased inwardly as shown.

Oil, from reservoir 9, passing into a pump housing 10, is placed under pressure by the impeller 11 and passes through a pressure line 12 to the valve block housing where it can feed to the valves 5 and 6 for selective control to either end of the cylinder via respective ports 13 and 14 and respective ports 20 and 21. Normally, oil continually circulates throughout the system, valves 5, 6, 7, 8 being partially open when actuator 3 is centered as shown.

Valve 5 controls oil pressure via conduit 23 to pressure chamber 26 at one end of the cylinder, while valve 6 controls oil pressure via conduit 24 to pressure chamber 25 at the other end of the cylinder. Valves 7 and 8 control exhaust from chambers 26 and 25, respectively.

A piston comprising the heads 27 and 28 is reciprocal in the cylinder, and it will be understood that the piston, in moving in either direction, can rock a linkage element 29 for the purpose of effecting movement of a steering mechanism, all in a conventional manner.

The conduits 23 and 24 have respective branches 31 and 30, which lead back into the valve housing and connect to valves 8 and 7, respectively, which have fixed ports 16 and 15, respectively. The valve housing has a pressure return chamber 32 connecting by a return conduit 33 to the oil tank 9. Chamber 32 also connects to an intermediate volume of the cylinder between the piston heads via a conduit 37. Thus, with all valves in the neutral position shown, oil is constantly recirculating throughout the entire system due to the fact that all of the valves are partially open, as hereinabove pointed out, and pressure forces on the piston heads are balanced to maintain a central position.

The piston heads 27 and 28 have wall portions 40 and 41, respectively, provided with respective biased check valves 43 and 44, respectively. Thus, each check valve is arranged to open against spring bias in a direction to permit fluid to flow from tank 9 via line 33, chamber 32, line 37, and chamber 35, into the respective pressure chamber of the cylinder. The check valves are spring biased closed under normal operating conditions, but in the event of any damage to the system which lowers pressure, any vacuum forming, in either pressure chamber, causes the respective check valve to open to admit oil from the reservoir, thus preventing air leakage.

The operation of the system valves 5–8 is generally conventional. Thus, when steering element 2 is moved to the right, lever 3 is thereby shifted to the right, and the valves 6 and 8 are thus closed to shut off oil pressure flow to chamber 25, and to shut off exhaust connection from chamber 26. Simultaneously, valves 5 and 7 are permitted to fully open during rightwards movement of element 3, valve 5 being opened by oil pressure in line 12 and valve 7 being opened by spring pressure of the spring shown therein. The opening of valves 5 and 7 permits pressure oil to flow to pressure chamber 26, while the opening of valve 7 permits return oil flow from pressure chamber 25. Thus, the piston moves in the direction of the arrow to effect steering in one direction. In a similar manner, shifting of element 3 to the left reverses the piston direction for steering in the opposite direction.

Referring now to FIGS. 2 and 3, two variations of the mounts for the check valves are disclosed. Thus, in FIG. 2, the wall portion 40 is provided with a suitable bore and passageway 52 to accommodate a check valve 53. The check valve 53 is part of a unitary assembly comprising a sleeve 50 which may be force fitted into the bore. The sleeve is provided with a suitable spring centering bent wire form 54 encompassed by a compression spring 51 which engages the inturned flanged end 55 of sleeve 50 and bears against the ball check valve 53 to maintain it in closed condition against an aperture formed in the opposite inturned end of sleeve 50.

In FIG. 3, the wall 40 is provided with a bore 56 to accommodate the ball check valve 53 seated in a constricted aperture at the end of bore 56, which ball check valve is biased into seating position by the spring 51. Spring 51 is retained in position by a snap ring 58 which, as shown, will be seen to be seated in a suitably provided groove cut into the wall of bore 56.

Having thus described my invention, I am aware that various changes may be made without departing from the spirit thereof and, accordingly, I do not seek to be limited to the precise illustration herein given except as set forth in the following claims.

I claim:

1. In a power boost steering system having a piston and cylinder, said cylinder having a pressure chamber, said piston having a face exposed to said pressure chamber, control means for conducting or exhausting fluid to said pressure chamber, said system comprising a source of fluid under exhaust pressure, and having means directly and permanently connecting said exhaust pressure source to said pressure chamber, said connecting means comprising a check valve openable by fluid under exhaust pressure to feed into said pressure chamber in the event of lowering of pressure in said pressure chamber to less than said exhaust source pressure, said check valve being carried by said piston.

2. In a power boost steering system having a piston and cylinder, said cylinder having a pressure chamber, said piston having a face exposed to said pressure chamber, control means for conducting or exhausting fluid to said pressure chamber, said system comprising a source of fluid under exhaust pressure, and having means directly and permanently connecting said exhaust pressure source to said pressure chamber, said connecting means comprising a check valve openable by fluid under exhaust pressure to feed into said pressure chamber in the event of lowering of pressure in said pressure chamber to less than said exhaust source pressure, said check valve being carried by said piston, said piston having a wall portion comprising said piston face and said check valve being carried in said wall portion in a bore thereof leading to said piston face.

3. In a power boost steering system having a double acting piston and cylinder, said piston having piston heads facing into respective pressure chambers of said cylinders, control means for conducting or exhausting fluid to said pressure chambers, said system comprising a source of fluid under exhaust pressure and said source comprising a central chamber formed of a central portion of said cylinder directly and permanently connected at all times to said exhaust source, said system further comprising means for connecting said central chamber with either of said pressure chambers wherein said connecting means comprises a respective check valve disposed intermediate said central chamber and each pressure chamber, said check valves being biased to closed position and operable in response to pressure reduction in respective pressure chambers to permit fluid flow from said central chamber to either of said chambers.

4. In a power boost steering system having a double acting piston and cylinder, said piston having piston heads facing into respective pressure chambers of said cylinders, control means for conducting or exhausting fluid to said pressure chambers, said system comprising a source of fluid under exhaust pressure and said source comprising a central chamber formed of a central portion of said cylinder directly and permanently connected at all times to said exhaust source, said system further comprising means for connecting said central chamber with either of said pressure chambers wherein said connecting means comprises a respective check valve disposed intermediate said central chamber and each pressure chamber, each check valve being carried by a respective piston head, said check valves being biased to closed position and operable in response to pressure reduction in respective pressure chambers to permit fluid flow from said central chamber to either of said chambers.

5. In a power boost steering system, a power cylinder and a piston therein, and control valve means therefor, a high pressure source of fluid and a reservoir at exhaust pressure connected to said valve means, said cylinder at one side of said piston having a first chamber connected to said valve means to receive or exhaust fluid pressure, said cylinder at the other side of said piston having a second chamber permanently exposed to reservoir exhaust pressure, and a check valve disposed between said cylinder chambers to permit fluid under exhaust pressure from said second chamber to bypass said piston to said first chamber in the event of pressure reduction in said first chamber to less than exhaust pressure in said second chamber.

6. In a system as set forth in claim 5, said valve means comprising a housing, said housing being connected to said reservoir, and said housing being connected to said second chamber of said cylinder.

7. In a system as set forth in claim 6, said check valve being carried by said piston and permitting passage for fluid therethrough from said second to said first chamber.

8. In a power boost steering system as set forth in claim 5, including an additional piston in said cylinder and a respective additional chamber therefor connected to said valve means to receive or exhaust fluid pressure, said aforementioned second chamber being mutual to and intermediate said pistonse, and an additional check valve disposed between said second chamber and said additional chamber to permit fluid under exhaust pressure from said second chamber to bypass said additional piston to said additional chamber in the event of pressure reduction in said additional chamber to less than exhaust pressure in said second chamber.

9. In a system as set forth in claim 8, said check valves being carried by respective pistons.

References Cited in the file of this patent

UNITED STATES PATENTS

| | | |
|---|---|---|
| 523,419 | Thorpe | July 24, 1894 |
| 1,001,340 | Blauvelt | Aug. 22, 1911 |
| 2,193,736 | Onions | Mar. 12, 1920 |
| 2,642,848 | Walraven et al. | June 23, 1953 |
| 2,778,339 | Mancusi | Jan. 22, 1957 |
| 2,880,707 | McCarthy | Apr. 7, 1959 |

FOREIGN PATENTS

| | | |
|---|---|---|
| 1,075,362 | France | Apr. 14, 1954 |